(12) United States Patent
Takikawa et al.

(10) Patent No.: US 10,358,937 B2
(45) Date of Patent: Jul. 23, 2019

(54) STARTING DEVICE

(71) Applicant: AISIN AW CO., LTD., Anjo-shi, Aichi-ken (JP)

(72) Inventors: Yoshihiro Takikawa, Anjo (JP); Kazuto Maruyama, Anjo (JP); Kazuhiro Itou, Anjo (JP)

(73) Assignee: AISIN AW CO., LTD., Anjo-shi, Aichi-ken (JP)

( * ) Notice: Subject to any disclaimer, the term of this patent is extended or adjusted under 35 U.S.C. 154(b) by 927 days.

(21) Appl. No.: 14/381,861

(22) PCT Filed: Mar. 27, 2013

(86) PCT No.: PCT/JP2013/059016
§ 371 (c)(1),
(2) Date: Aug. 28, 2014

(87) PCT Pub. No.: WO2013/161493
PCT Pub. Date: Oct. 31, 2013

(65) Prior Publication Data
US 2015/0023781 A1 Jan. 22, 2015

(30) Foreign Application Priority Data
Apr. 26, 2012 (JP) .................................. 2012-100767

(51) Int. Cl.
F01D 25/04 (2006.01)
F16H 45/02 (2006.01)
F16F 15/123 (2006.01)

(52) U.S. Cl.
CPC ........ F01D 25/04 (2013.01); F16F 15/12366 (2013.01); F16H 45/02 (2013.01);
(Continued)

(58) Field of Classification Search
CPC .. F01D 25/04; F05D 2260/96; F05D 2260/85; F16H 45/02; F16H 2045/0205;
(Continued)

(56) References Cited

U.S. PATENT DOCUMENTS 4,866,935 A * 9/1989 Hayabuchi .............. F16H 41/26
60/361
5,713,442 A 2/1998 Murata et al.
(Continued)

FOREIGN PATENT DOCUMENTS

DE 10358901 A1 2/2005
DE 102008057648 A1 6/2009
(Continued)

OTHER PUBLICATIONS

International Search Report for PCT/JP2013/059016 dated Apr. 23, 2013.

Primary Examiner — Ninh H. Nguyen
Assistant Examiner — Wayne A Lambert
(74) Attorney, Agent, or Firm — Sughrue Mion, PLLC

(57) ABSTRACT

A starting device includes a pump impeller, a turbine runner for rotating together with the pump impeller, a damper mechanism having an input element receiving power from an internal combustion engine, an output element coupled to a speed change device, an intermediate element between the input and output elements, and a dynamic damper for damping vibration at a predetermined frequency among vibration transferred to the speed change device. The starting device includes a first dynamic damper having an elastic member and a first mass body coupled the first elastic member, and coupled to the intermediate element; and a second dynamic damper having an elastic member and a second mass body connected to the second elastic member, and coupled to the intermediate element. The first mass body (Continued)

of the first dynamic damper or the second mass body of the second dynamic damper includes at least the turbine runner.

18 Claims, 3 Drawing Sheets

(52) U.S. Cl.
CPC ...... *F05D 2260/85* (2013.01); *F05D 2260/96* (2013.01); *F16H 2045/0205* (2013.01); *F16H 2045/0226* (2013.01); *F16H 2045/0294* (2013.01)

(58) Field of Classification Search
CPC ..... F16H 2045/0226; F16H 2045/0294; F16H 2045/0221; F16F 15/12366; F16F 15/1236; F16F 15/12353; F16F 15/12
USPC ..................................................... 416/197 C
See application file for complete search history.

(56) References Cited

U.S. PATENT DOCUMENTS

| | | | | |
|---|---|---|---|---|
| 6,056,093 | A * | 5/2000 | Hinkel | F16H 41/26 192/212 |
| 6,695,110 | B2 * | 2/2004 | Maienschein | F16H 45/02 192/213.1 |
| 7,073,646 | B2 * | 7/2006 | Sasse | F16F 15/12366 192/213.1 |
| 8,135,525 | B2 * | 3/2012 | Swank | F16F 15/12353 701/69 |
| 2003/0173175 | A1 * | 9/2003 | Tomiyama | F16H 45/02 192/3.29 |
| 2004/0185940 | A1 * | 9/2004 | Yamamoto | F16F 15/12366 464/68.4 |
| 2004/0226794 | A1 | 11/2004 | Sasse et al. | |
| 2010/0236228 | A1 * | 9/2010 | Degler | F16F 15/145 60/338 |
| 2010/0269497 | A1 | 10/2010 | Engelmann et al. | |
| 2011/0031083 | A1 * | 2/2011 | Matsuoka | F16H 45/02 192/3.29 |
| 2011/0192692 | A1 | 8/2011 | Werner et al. | |
| 2011/0195795 | A1 * | 8/2011 | Murata | F16F 15/12366 464/67.1 |
| 2012/0031722 | A1 * | 2/2012 | Takikawa | F16H 45/02 192/3.28 |
| 2016/0169358 | A1 * | 6/2016 | Kawahara | F16H 45/02 192/3.28 |
| 2017/0198795 | A1 * | 7/2017 | Tsuji | F16H 45/02 |

FOREIGN PATENT DOCUMENTS

| | | |
|---|---|---|
| JP | 09-53700 A | 2/1997 |
| JP | 2009-115112 A | 5/2009 |
| JP | 2010-255853 A | 11/2010 |
| JP | 2011-058557 A | 3/2011 |
| JP | 2012-506004 A | 3/2012 |
| JP | 2012-077827 A | 4/2012 |
| WO | 2011/138216 A1 | 11/2011 |

* cited by examiner

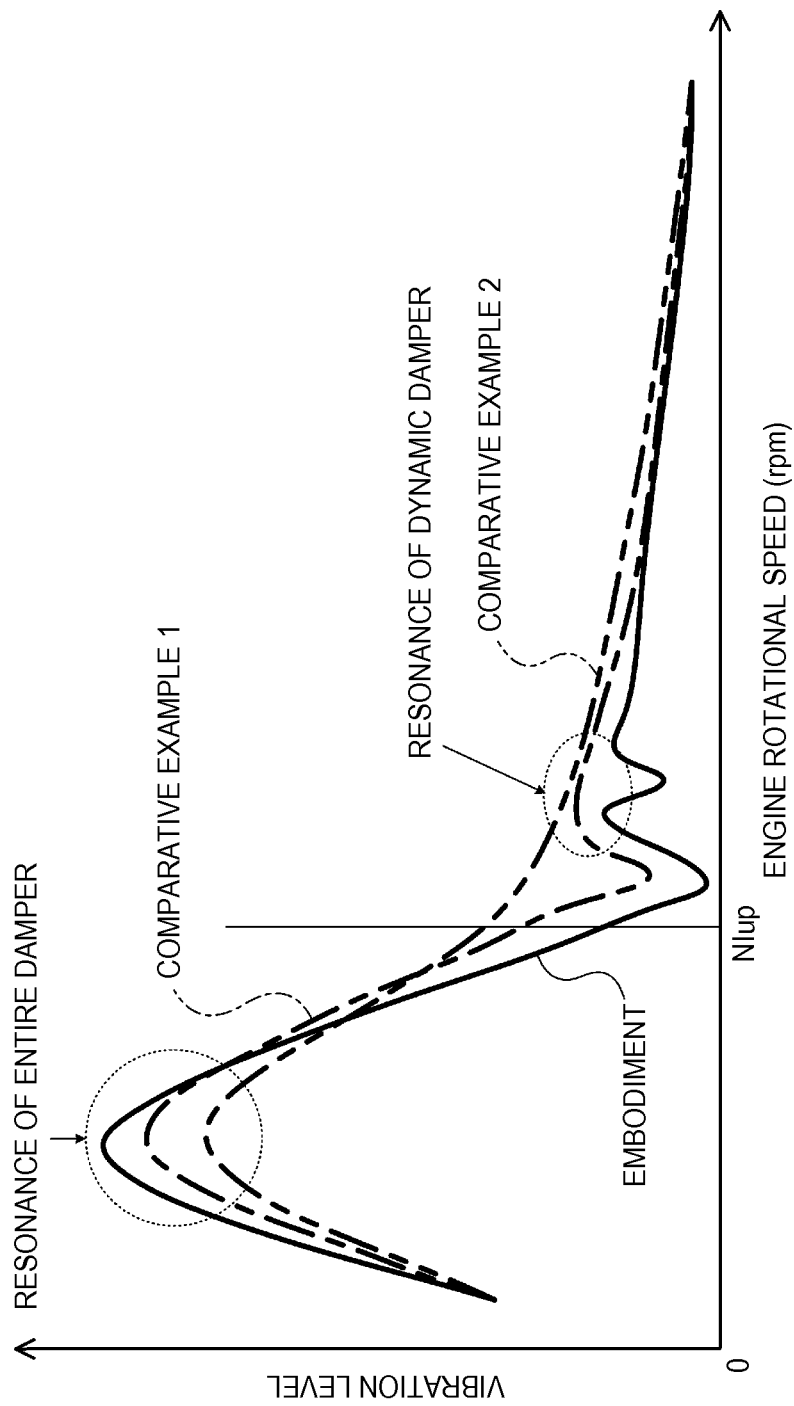

STARTING DEVICE

CROSS REFERENCE TO RELATED APPLICATIONS

This application is a National Stage of International Application No. PCT/JP2013/059016 filed Mar. 27, 2013, claiming priority based on Japanese Patent Application No. 2012-100767, filed Apr. 26, 2012, the contents of all of which are incorporated herein by reference in their entirety.

TECHNICAL FIELD

The present invention relates to a starting device that includes a damper mechanism that has a plurality of rotary elements.

BACKGROUND ART

Hitherto, there has been known a starting device that includes a pump impeller and a turbine runner that constitute a torque converter, a damper mechanism that has a plurality of rotary elements, and two dynamic dampers each composed of an elastic member and a mass body and coupled to one of the plurality of rotary elements of the damper mechanism (see Patent Document 1, for example).

RELATED-ART DOCUMENTS

Patent Documents

[Patent Document 1] International Publication No. 2011/138216 (WO 2011/138216)

SUMMARY OF THE INVENTION

In the starting device according to the related art described above, however, each of the two dynamic dampers has a dedicated mass body, and thus it may be difficult to suppress an increase in size of the entire device. Further, if the two dynamic dampers are disposed adjacent to each other between the damper mechanism and the turbine runner as in the starting device according to the related art described above, the length (axial length) of the torque converter etc. in the axial direction may be increased.

It is therefore a main object of the present invention to make a starting device that includes two dynamic dampers compact.

In order to achieve the foregoing main object, the starting device according to the present invention adopts the following means.

The present invention provides a starting device that includes a pump impeller, a turbine runner capable of rotating together with the pump impeller, a damper mechanism that has an input element to which power is input from an internal combustion engine, an output element coupled to a speed change device, and an intermediate element disposed between the input element and the output element, and a dynamic damper that damps vibration at a predetermined frequency among vibration transferred to the speed change device, the starting device including:

a first dynamic damper including a first elastic member and a first mass body coupled to one end of the first elastic member, and coupled to the intermediate element; and a second dynamic damper including a second elastic member and a second mass body coupled to one end of the second elastic member, and coupled to the intermediate element, in which one of the first mass body of the first dynamic damper and the second mass body of the second dynamic damper includes at least the turbine runner.

The starting device includes the first and second dynamic dampers coupled to the intermediate element of the damper mechanism which damps vibration of the internal combustion engine to transfer power to the speed change device. One of the first mass body of the first dynamic damper and the second mass body of the second dynamic damper includes at least the turbine runner. Consequently, use of the turbine runner as the first or second mass body of one of the first and second dynamic dampers makes it possible to reduce the number of parts of the starting device, and to suppress an increase in size of the starting device. As a result, the starting device, which includes the first and second dynamic dampers coupled to a power transfer member via a coupling member, can be made compact. In addition, if the first and second dynamic dampers are coupled to the intermediate element which is more likely to vibrate than the input element and the output element, vibration of the intermediate element can be suppressed by one of the first and second dynamic dampers to lower the vibration level of the entire damper mechanism, and resonance of one of the first and second dynamic dampers, that is, vibration caused as vibration is damped by one of the first and second dynamic dampers, can be suppressed by the other of the first and second dynamic dampers. Thus, with such a configuration, vibration transferred to the damper mechanism can be effectively damped by the first and second dynamic dampers.

The term "coupling" as used herein includes "coupling" through engagement between a plurality of members, and "coupling" through substantial engagement between an elastic member (spring) and another member such as a mass body (weight), which are disposed so as to be disengageable from each other, for example, through abutment of the elastic member with the other member caused along with rotation of the elastic member, for example. Backlash may be or may not be provided between the elastic member and the other member.

The starting device may further include a coupling member that couples the other end of the first elastic member and the other end of the second elastic member to the intermediate element; and the coupling member may project radially outward with respect to a position at which the coupling member is coupled to the first elastic member to be coupled to the second elastic member. Consequently, common use of the coupling member between the first dynamic damper and the second dynamic damper makes it possible to decrease the number of parts of the starting device, and to suppress an increase in axial length of the starting device. As a result, it is possible to make the starting device, which includes the first and second dynamic dampers coupled to the power transfer member via the coupling member, much more compact.

The coupling member may be coupled to the second elastic member at a location radially outward of the turbine runner. The second elastic member may at least partially overlap the turbine runner in an axial direction. Consequently, the second elastic member of the second dynamic damper can be disposed in a region in the vicinity of the outer peripheral portion of the turbine runner, which tends to be a dead space, and the space efficiency of the starting device can be further improved.

The second mass body of the second dynamic damper may include the turbine runner and a turbine coupling member that couples the turbine runner and the second elastic member to each other. Use of the turbine runner as the second mass body of the second dynamic damper makes it possible to secure a sufficient mass of the second mass body and to suppress an increase in size and axial length of the starting device.

The first mass body of the first dynamic damper may be composed of a first plate member and a second plate member that face each other in an axial direction of the starting device and that are coupled to each other, and the coupling member may extend between the first plate member and the second plate member to project radially outward. Consequently, a sufficient mass of the first mass body can be secured and an increase in axial length of the starting device can be suppressed by reducing the dimensions of the first plate member and the second plate member which constitute the first mass body in the axial direction of the starting device.

The first plate member may extend radially outward to support the second elastic member in the axial direction of the starting device. Consequently, the entire starting device can be made more compact by using the first plate member which constitutes the first mass body also as a support member for the second elastic member of the second dynamic damper.

The coupling member may include an axially extending portion that extends in the axial direction toward the turbine runner at a location radially outward of the second plate member. Consequently, the coupling member and the second elastic member of the second dynamic damper disposed in a region in the vicinity of the outer peripheral portion of the turbine runner can be engaged with each other, the first elastic member of the first dynamic damper and the second elastic member of the second dynamic damper can be brought closer to each other in the axial direction of the starting device, and the first mass body and the turbine runner and the turbine coupling member which serve as the second mass body can be brought closer to each other.

The first plate member may include an axially extending portion that extends in the axial direction toward the turbine runner at a location radially outward of axially extending portion of the coupling member, and an outer peripheral portion that extends radially outward from the axially extending portion. Consequently, the first plate member can be extended radially outward to secure a sufficient mass of the first plate member, and an increase in axial length of the starting device can be suppressed.

The intermediate element may be engaged with the input element via a third elastic member, and engaged with the output element via a fourth elastic member; and the third elastic member may at least partially overlap the axially extending portion of the first plate member in the axial direction. Consequently, the axial length of the starting device can be further shortened.

The starting device may further include a lock-up clutch that selectively couples the internal combustion engine and the damper mechanism to each other; and a radially outer portion of the lock-up clutch, the third elastic member of the damper mechanism, a radially outer portion of the first mass body, and the second elastic member may be disposed at the same height in a radial direction.

A rigidity of the first elastic member may be higher than a rigidity of the second elastic member. Consequently, vibration of the power transfer member can be suppressed by the first dynamic damper to lower the vibration level, and resonance of the first dynamic damper, that is, vibration caused as vibration is damped by the first dynamic damper, can be suppressed by the second dynamic damper.

BRIEF DESCRIPTION OF THE DRAWINGS

FIG. 3 illustrates an example of the relationship between the rotational speed of an engine that serves as a motor and the vibration level of a damper mechanism 10.

MODES FOR CARRYING OUT THE INVENTION

Now, an embodiment of the present invention will be described below.

Figure 1:
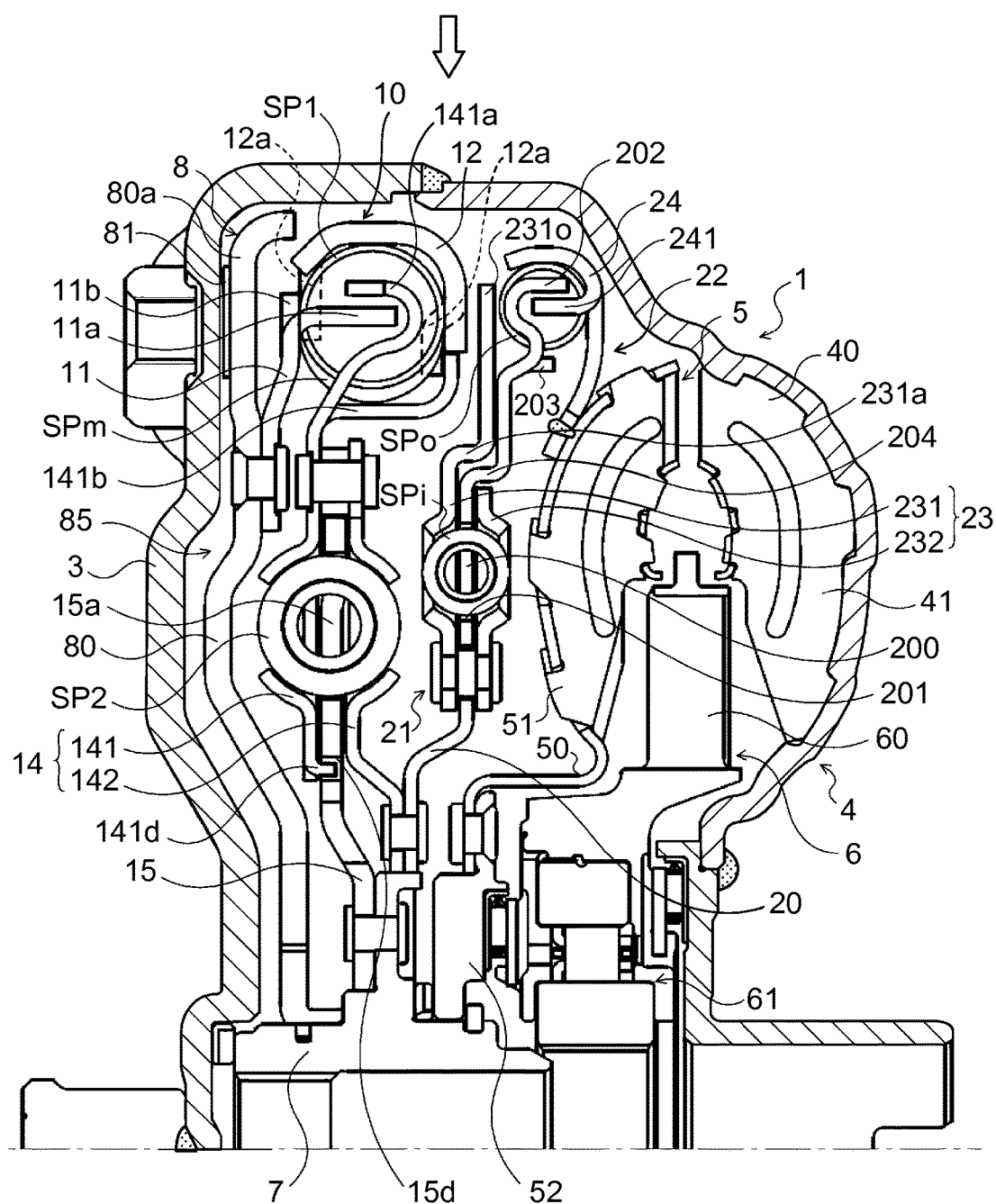
FIG. 1 is a partial sectional view illustrating a fluid transmission apparatus 1 of a starting device according to an embodiment of the present invention.

FIG. 1 illustrates the configuration of a fluid transmission apparatus 1 of a starting device according to an embodiment of the present invention. The fluid transmission apparatus 1 illustrated in the drawing is a torque converter mounted on a vehicle including an engine (internal combustion engine) serving as a motor, and includes a front cover (input member) 3 coupled to a crankshaft (not illustrated) of the engine, a pump impeller (input-side fluid transmission element) 4 fixed to the front cover 3, a turbine runner (output-side fluid transmission element) 5 disposed coaxially with the pump impeller 4 so as to be rotatable, a stator 6 that adjusts a flow of working oil (a working fluid) from the turbine runner 5 to the pump impeller 4, a damper hub (output member) 7 fixed to an input shaft of a speed change device (not illustrated) which is an automatic transmission (AT) or a continuously variable transmission (CVT), a single-plate friction lock-up clutch mechanism 8 having a lock-up piston 80, and a damper mechanism 10 connected to the damper hub 7 and connected to the lock-up piston 80.

The pump impeller 4 has a pump shell 40 tightly fixed to the front cover 3, and a plurality of pump blades 41 disposed on the inner surface of the pump shell 40. The turbine runner 5 has a turbine shell 50, and a plurality of turbine blades 51 disposed on the inner surface of the turbine shell 50. The turbine shell 50 is fixed to a turbine hub 52 via a rivet. The turbine hub 52 is supported such that movement of the turbine hub 52 in the axial direction of the fluid transmission apparatus 1 is restrained by a snap ring or the like fixed to the damper hub 7, and so as to be rotatable with the damper hub 7. The stator 6 has a plurality of stator blades 60. The rotational direction of the stator 6 is set to only one direction by a one-way clutch 61. The pump impeller 4 and the turbine runner 5 are provided to face each other. The pump impeller 4, the turbine runner 5, and the stator 6 form a torus (annular flow passage) that allows circulation of working oil.

The lock-up clutch mechanism 8 can establish and release lock-up in which the front cover 3 and the damper hub 7 are coupled to each other via the damper mechanism 10. In the embodiment, as illustrated in FIG. 1, the lock-up piston 80 of the lock-up clutch mechanism 8 is disposed inside the front cover 3 and in the vicinity of the engine side (right side in the drawing) inner wall surface of the front cover 3, and fitted with the damper hub 7 so as to be slidable in the axial direction and rotatable. A friction member 81 is affixed to a surface of the lock-up piston 80 on the outer peripheral side and on the front cover 3 side. A lock-up chamber 85 is defined between the back surface (a surface on the left side in the drawing) of the lock-up piston 80 and the front cover 3. The lock-up chamber 85 is connected to a hydraulic control device (not illustrated) via a working oil supply hole (not illustrated) and an oil passage formed in the input shaft.

Working oil to be supplied from the hydraulic control device to the pump impeller 4 and the turbine runner 5 (torus) can flow into the lock-up chamber 85. Thus, if the pressure in a fluid transmission chamber in which the pump impeller 4 and the turbine runner 5 are housed and the pressure in the lock-up chamber 85 are kept equal to each other, the lock-up piston 80 is not moved toward the front cover 3 side, and the lock-up piston 80 is not frictionally engaged with the front cover 3. If the pressure in the lock-up chamber 85 is decreased by the hydraulic control device (not illustrated), in contrast, the lock-up piston 80 is moved toward the front cover 3 by a pressure difference to be frictionally engaged with the front cover 3. Consequently, the front cover 3 is coupled to the damper hub 7 via the damper mechanism 10.

Figure 2:
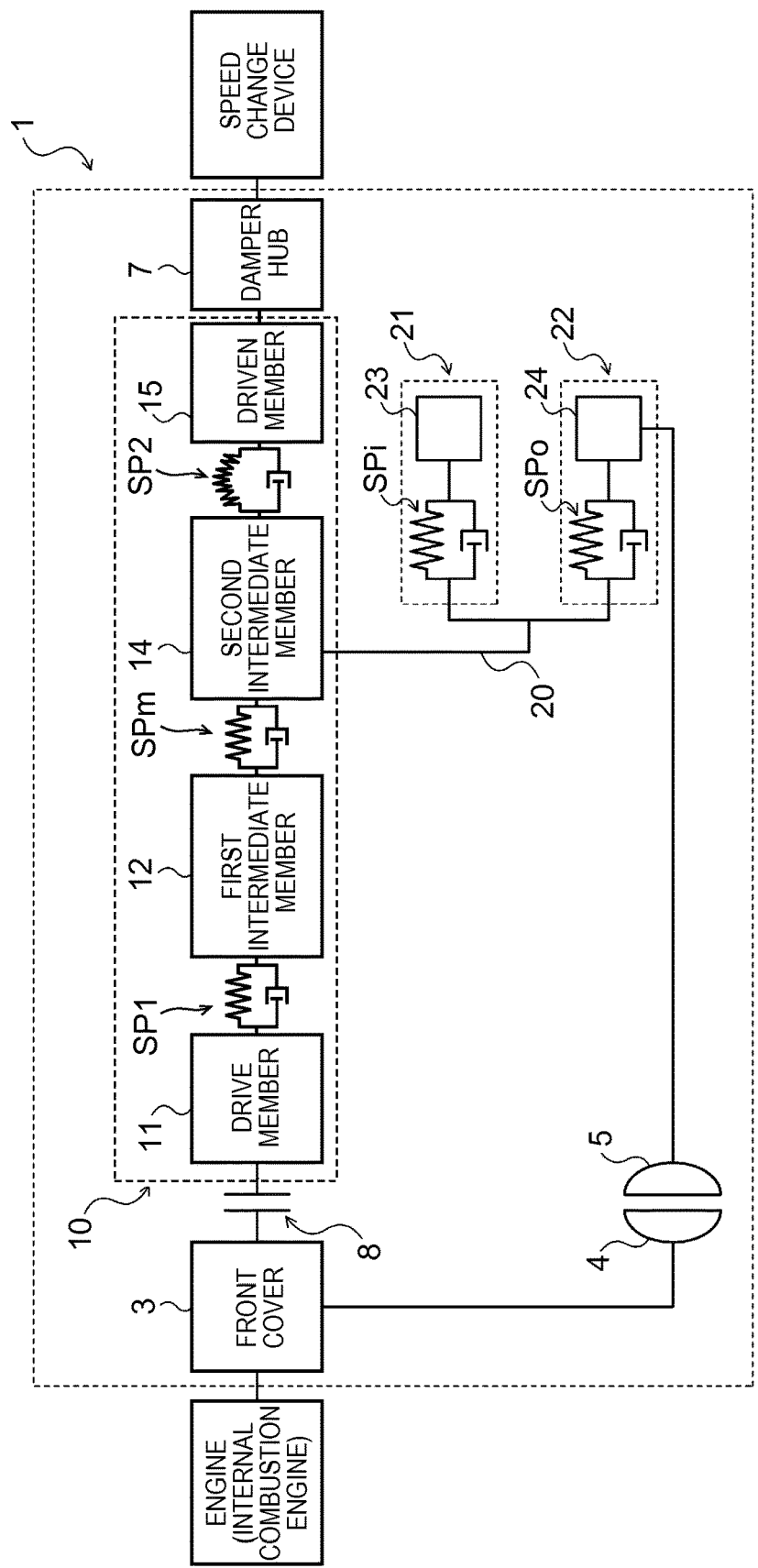
FIG. 2 illustrates a schematic configuration of the fluid transmission apparatus 1.

As illustrated in FIGS. 1 and 2, the damper mechanism 10 includes, as power transfer members that transfer power from the engine to the speed change device, a drive member (input element) 11, a first intermediate member (first intermediate element) 12 engaged with the drive member 11 via a plurality of first springs (third elastic member) SP1, a second intermediate member (second intermediate element) 14 engaged with the first intermediate member 12 via a plurality of intermediate springs (intermediate elastic member) SPm, and a driven member (output element) 15 engaged with the second intermediate member 14 via a plurality of second springs (fourth elastic member) SP2. In the embodiment, the first springs SP1 and the intermediate springs SPm are coil springs made of a metal material spirally wound so as to have an axis that extends straight when no load is applied. The second springs SP2 are arc springs made of a metal material wound so as to have an axis that extends arcuately when no load is applied. The first springs SP1, the intermediate springs SPm, and the second springs SP2 operate in series with each other. Thus, adopting arc springs as the second springs SP2, among the first springs SP1, the intermediate springs SPm, and the second springs SP2, further lengthens the stroke (lowers the rigidity) of the damper mechanism 10.

The drive member 11 has a plurality of spring abutment portions 11a that abut against respective first ends of the first springs SP1, and a plurality of spring support portions 11b. The drive member 11 is fixed to the lock-up piston 80 of the lock-up clutch mechanism 8 via a rivet, and disposed in an outer peripheral region inside a housing defined by the front cover 3 and the pump shell 40 of the pump impeller 4. The first intermediate member 12 is constituted as an annular member capable of supporting the first springs SP1 and the intermediate springs SPm so as to be slidable on the same circumference together with the plurality of spring support portions 11b of the drive member 11. In the embodiment, the first intermediate member 12 is supported by the second intermediate member 14 so as to be rotatable about the axis of the fluid transmission apparatus 1, and disposed in an outer peripheral region inside the housing. In addition, as illustrated in FIG. 1, the first intermediate member 12 has a plurality of spring abutment portions 12a that are disposed between respective second ends of the first springs SP1 and respective first ends of the intermediate springs SPm that are adjacent to the first springs SP1 and abut against the second ends of the first springs SP1 and the first ends of the intermediate springs SPm.

The second intermediate member 14, which is disposed between the drive member 11 and the driven member 15, is composed of an annular first plate 141 and an annular second plate 142 coupled (fixed) to the first plate 141 via a rivet. In the embodiment, the second intermediate member 14 is supported by the driven member 15 so as to be rotatable about the axis of the fluid transmission apparatus 1. The first plate 141 of the second intermediate member 14 has a plurality of spring abutment portions 141a that abut against respective second ends of the intermediate springs SPm, a plurality of support portions 141b that rotatably support the inner peripheral portion of the first intermediate member 12, and a plurality of spring support portions that support the second springs SP2. The spring abutment portions 141a and the support portions 141b are provided on the outer peripheral side. The spring support portions are provided on the inner peripheral side. In addition, the second plate 142 of the second intermediate member 14 has a plurality of spring support portions that face the respective spring support portions of the first plate 141 to support the second springs SP2. Further, the first and second plates 141 and 142 are formed with a plurality of spring abutment portions (not illustrated) that abut against respective first ends of the second springs SP2.

Consequently, the plurality of first springs SP1 are each disposed in the outer peripheral region of the damper mechanism 10 (radially outward with respect to the second springs SP2) so as to be positioned between the corresponding spring abutment portion 11a of the drive member 11 and the corresponding spring abutment portion 12a of the first intermediate member 12. The plurality of intermediate springs SPm are each disposed in the outer peripheral portion of the damper mechanism 10 so as to be positioned between the corresponding spring abutment portion 12a of the first intermediate member 12 and the second intermediate member 14, that is, the corresponding spring abutment portion 141a of the first plate 141. In addition, the plurality of second springs SP2 are disposed away from the first springs SP1 and the intermediate springs SPm in the radial direction of the fluid transmission apparatus 1, and positioned radially inward with respect to the first springs SP1 and the intermediate springs SPm (in the inner peripheral region of the damper mechanism 10).

That is, the arc springs adopted as the second springs SP2 have a hysteresis that is higher than that of the coil springs. Therefore, in the damper mechanism 10 according to the embodiment, in order that the vibration damping effect of the second springs SP2 will not be impaired by the hysteresis, the second springs SP2 which are arc springs are disposed on radially inward with respect to the first springs SP1 and the intermediate springs SPm. Consequently, a centrifugal force that acts on the second springs SP2 is reduced to reduce the hysteresis of the second springs SP2, that is, a friction force that acts on the second springs SP2 when a load is reduced, which keeps good vibration damping characteristics of the second springs SP2.

The driven member 15 is disposed between the first plate 141 and the second plate 142 of the second intermediate member 14, and fixed to the damper hub 7 via a rivet. In addition, the driven member 15 has a plurality of spring abutment portions 15a that abut against respective second ends of the second springs SP2. Further, the driven member 15 has a plurality of arcuate slits 15d to be engaged with projecting portions 141d that extend in the axial direction of the fluid transmission apparatus 1 from the inner peripheral portion of the first plate 141 of the second intermediate member 14. With the projecting portions 141d of the first plate 141 engaged (freely fitted) with the respective slits 15d of the driven member 15, the second intermediate member 14 is supported by the driven member 15 so as to be rotatable with respect to the driven member 15 in a range matching the circumferential length of the slits 15d, and disposed about the axis of the fluid transmission apparatus 1.

A first dynamic damper 21 and a second dynamic damper 22 are coupled via a coupling member 20 to an intermediate element of the damper mechanism 10, which is composed of the first intermediate member 12, the intermediate springs SPm, and the second intermediate member 14 discussed above. The first dynamic damper 21 includes a plurality of inner peripheral-side springs (first elastic member) SPi, and a first mass body 23 that is independent of the damper mechanism 10 (that does not constitute the damper mechanism 10) and that is coupled to first ends of the inner peripheral-side springs SPi. The second dynamic damper 22 includes a plurality of outer peripheral-side springs (second elastic member) SPo, and a turbine coupling member 24 that is independent of the damper mechanism 10 (that does not constitute the damper mechanism 10), that is coupled to first ends of the outer peripheral-side springs SPo, and that constitutes a second mass body together with the turbine runner 5 discussed above. In the embodiment, the rigidity (=spring constant) of the inner peripheral-side springs SPi of the first dynamic damper 21 is determined to be higher than the rigidity of the outer peripheral-side springs SPo of the second dynamic damper 22. The "dynamic damper" is a mechanism that damps vibration of a vibrating member by applying the opposite phase vibration to the vibrating member at a frequency (engine rotational speed) that coincides with the resonance frequency of the vibrating member, and is constituted by coupling a spring and a mass body to the vibrating member such that the spring and the mass body are not included in the torque transfer path. The dynamic damper can be caused to act at a desired frequency by adjusting the rigidity of the spring and the weight of the mass body.

In the embodiment, the coupling member 20 is fixed to the second plate 142 of the second intermediate member 14 via a rivet, and rotatably supported by the damper hub 7 together with the second plate 142. In addition, the coupling member 20 is a plate member formed in a generally annular shape. The inner peripheral portion of the coupling member 20 is formed with a plurality of notched portions 200 in which the respective inner peripheral-side springs SPi of the first dynamic damper 21 are disposed, and a plurality of inner peripheral-side spring abutment portions 201 that abut against (are engaged with) respective second ends of the inner peripheral-side springs SPi. Further, the radially outer portion of the coupling member 20 is formed with a plurality of outer peripheral-side spring abutment portions 202 that abut against (are engaged with) respective second ends of the outer peripheral-side springs SPo of the second dynamic damper 22, and a plurality of spring support portions 203. An axially extending portion 204 having a short tube shape is provided between the inner peripheral portion and the radially outer portion of the coupling member 20, and extends in the axial direction of the fluid transmission apparatus 1 from the inner peripheral portion toward the turbine runner 5.

As illustrated in FIG. 1, the first mass body 23 of the first dynamic damper 21 is composed of a first plate member 231 and a second plate member 232 that face each other in the axial direction of the fluid transmission apparatus 1 and that are coupled to each other via the coupling member 20. The first plate member 231 is formed in a generally annular shape. The inner peripheral portion of the first plate member 231 is formed with a plurality of spring support portions that support the inner peripheral-side springs SPi. In addition, an axially extending portion 231a having a short tube shape extends in the axial direction of the fluid transmission apparatus 1 from the inner peripheral portion of the first plate member 231 toward the turbine runner 5, and an outer peripheral portion 231o of the first plate member 231 extends radially outward from an end portion of the axially extending portion 231a on the turbine runner 5 side. The second plate member 232 is also formed in a generally annular shape, and has an inside diameter that is generally the same as the inside diameter of the first plate member 231 and an outside diameter that is smaller than the outside diameter of the first plate member 231. The second plate member 232 has a plurality of spring support portions that face the respective spring support portions of the first plate member 231 to support the inner peripheral-side springs SPi. The first and second plate members 231 and 232 are formed with a plurality of spring abutment portions (not illustrated) that abut against (are engaged with) the respective first ends of the inner peripheral-side springs SPi.

As illustrated in FIG. 1, the inner peripheral portion of the first plate member 231 which constitutes the first mass body 23 and the inner peripheral portion of the second plate member 232 are coupled to each other via a rivet that penetrates a hole formed in the inner peripheral portion of the coupling member 20 such that the first plate member 231 is positioned on the damper mechanism 10 side and the second plate member 232 is positioned on the turbine runner 5 side, and the outer peripheral portion 231o of the first plate member 231 extends to a location near the back surface of the first intermediate member 12. In addition, the axially extending portion 204 of the coupling member 20 extends in the axial direction of the fluid transmission apparatus 1 toward the turbine runner 5 at a location radially inward of the axially extending portion 231a of the first plate member 231 and radially outward of the second plate member 232. The radially outer portion of the coupling member 20 is disposed on the turbine runner 5 side with respect to the outer peripheral portion 231o of the first plate member 231 which constitutes the first mass body 23, and extends radially outward with respect to the second plate member 232.

That is, the axially extending portion 231a of the first plate member 231 overlaps the axially extending portion 204 of the coupling member 20 as seen in the radial direction of the fluid transmission apparatus 1 (in the direction of the white arrow in FIG. 1), the axially extending portion 204 of the coupling member 20 overlaps the second plate member 232 as seen in the radial direction of the fluid transmission apparatus 1, and further the outer peripheral portion 231o of the first plate member 231 overlaps the axially extending portion 231a of the first plate member 231 and the second plate member 232 as seen in the radial direction of the fluid transmission apparatus 1. The outer peripheral-side spring abutment portions 202 of the coupling member 20 are positioned on the back surface side of the first intermediate member 12 and in the vicinity of the outer peripheral portion of the turbine runner 5. Thus, the coupling member 20 extends between the first plate member 231 and the second plate member 232 to project radially outward.

The turbine coupling member 24 which constitutes the second mass body of the second dynamic damper 22 is constituted as an annular member capable of supporting the plurality of outer peripheral-side springs SPo so as to be slidable on the same circumference together with the plurality of spring support portions 203 of the coupling member 20 and the outer peripheral portion 231o of the first plate member 231 of the first mass body 23. In addition, the turbine coupling member 24 has a plurality of spring abutment portions 241 that abut against (are engaged with) respective first ends of the outer peripheral-side springs SPo. The inner peripheral portion of the turbine coupling member 24 is fixed to the outer peripheral side back surface of the turbine shell 50 which constitutes the turbine runner 5.

In the fluid transmission apparatus 1 configured as discussed above, as illustrated in FIG. 1, the coupling member 20 which couples the second ends of the inner peripheral-side springs SPi of the first dynamic damper 21 and the second ends of the outer peripheral-side springs SPo of the second dynamic damper 22 to the intermediate element of the damper mechanism 10 is coupled to the outer peripheral-side springs SPo at a location radially outward with respect to the position at which the coupling member 20 is coupled to the inner peripheral-side springs SPi, that is, at a location radially outward of the turbine runner 5. In addition, the outer peripheral-side springs SPo of the second dynamic damper 22 at least partially overlap the turbine runner 5 in the axial direction (at least partially overlap the turbine runner 5 as seen in the radial direction of the fluid transmission apparatus 1). Further, an outer peripheral portion (radially outer portion of the lock-up clutch mechanism 8) 80a of the lock-up piston 80 which constitutes the lock-up clutch mechanism 8, the first springs SP1 and the intermediate springs SPm of the damper mechanism 10, the outer peripheral portion 231o of the first plate member 231, and the outer peripheral-side springs SPo of the second dynamic damper 22 at least partially overlap each other as seen in the axial direction of the fluid transmission apparatus 1.

Next, operation of the fluid transmission apparatus 1 discussed above will be described.

As seen from FIG. 2, when lock-up is released by the lock-up clutch mechanism 8 and the front cover 3 and the damper hub 7 are not coupled to each other via the damper mechanism 10, power from the engine serving as the motor is transferred to the input shaft of the speed change device via a path including the front cover 3, the pump impeller 4, the turbine runner 5, the turbine coupling member 24, the inner peripheral-side springs SPo, the coupling member 20, the second intermediate member 14, the second springs SP2, the driven member 15, and the damper hub 7. In this event, each of the inner peripheral-side springs SPo and the second springs SP2 is basically completely contracted.

As seen from FIG. 2, when lock-up is established by the lock-up clutch mechanism 8 and the front cover 3 and the damper hub 7 are coupled to each other via the damper mechanism 10, power from the engine serving as the motor is transferred to the input shaft of the speed change device via a path including the front cover 3, the lock-up clutch mechanism 8, the drive member 11, the first springs SP1, the first intermediate member 12, the intermediate springs SPm, the second intermediate member 14, the second springs SP2, the driven member 15, and the damper hub 7. In this event, variations in torque (vibration) input to the front cover 3 are mainly absorbed by the first springs SP1, the intermediate springs SPm, and the second springs SP2 of the damper mechanism 10.

During lock-up, in addition to the damper mechanism 10, the inner peripheral-side springs SPi engaged with the inner peripheral-side spring abutment portions 201 of the coupling member 20 coupled to the second intermediate member 14 of the damper mechanism 10 and the first mass body 23 engaged with the inner peripheral-side springs SPi constitute the first dynamic damper 21. Consequently, during lock-up, vibration transferred from the engine side to the front cover 3 can be effectively absorbed (damped) to be removed from the second intermediate member 14 of the damper mechanism 10 by the first dynamic damper 21. In the fluid transmission apparatus 1, further, the outer peripheral-side springs SPo engaged with the outer peripheral-side spring abutment portions 202 of the coupling member 20 coupled to the second intermediate member 14 of the damper mechanism 10, the turbine coupling member 24 engaged with the outer peripheral-side springs SPo, and the turbine runner 5 fixed to the turbine coupling member 24 and serving as a mass that does not contribute to torque transfer between the front cover 3 and the damper hub 7 constitute the second dynamic damper 22. Consequently, during lock-up, vibration transferred from the engine side to the front cover 3 can be effectively absorbed (damped) to be removed from the second intermediate member 14 of the damper mechanism 10 also by the second dynamic damper 22.

In the fluid transmission apparatus 1 according to the embodiment, the rigidity of the inner peripheral-side springs SPi which prescribes the vibration damping characteristics (resonance frequency) of the first dynamic damper 21, the weight (inertia) of the first mass body 23, the rigidity of the outer peripheral-side springs SPo which prescribes the vibration damping characteristics (resonance frequency) of the second dynamic damper 22, and the weight (inertia) of the turbine coupling member 24 and the turbine runner 5 are adjusted on the basis of the number of cylinders of the engine serving as the motor and a lock-up rotational speed Nlup at which lock-up is established. Consequently, even if lock-up is established when the rotational speed of the engine is very low at 1000 rpm, for example, vibration transferred from the engine serving as the motor to the fluid transmission apparatus 1, that is, the front cover 3, can be effectively absorbed (damped) by the first and second dynamic dampers 21 and 22 to suppress transfer of such vibration to the damper hub 7 well. As a result, the fluid transmission apparatus 1 can improve the power transfer efficiency, and hence the fuel efficiency of the engine, by establishing lock-up when the rotational speed of the engine reaches the lock-up rotational speed Nlup which is relatively low at about 1000 rpm, for example.

FIG. 3 illustrates an example of the relationship between the rotational speed of the engine (which corresponds (is proportional) to the frequency discussed above) with lock-up established and the vibration level of the damper mechanism 10 which includes the first and second dynamic dampers 21 and 22 discussed above. The drawing indicates the results of a simulation for a torsional vibration system performed to verify the usefulness of coupling the first and second dynamic dampers 21 and 22 to one (here, the second intermediate member 14) of the plurality of rotary elements of the damper mechanism 10. The drawing illustrates an example of the relationship between the rotational speed of the engine (front cover 3) in a plurality of damper mechanisms including the damper mechanism 10 according to the embodiment and the vibration level at the driven member 15 (damper hub 7) which is the output element of the damper mechanism, obtained through the simulation. The solid line in FIG. 3 indicates the vibration level for the damper mechanism 10 according to the embodiment described above. The dash-and-dot line in FIG. 3 indicates the vibration level for a damper mechanism according to Comparative Example 1 obtained by removing the turbine coupling member 24 and the outer peripheral-side springs SPo, that is, the second dynamic damper 22, from the damper mechanism 10 according to the embodiment. Further, the dash-double-dot line in FIG. 3 indicates the vibration level for a damper mechanism according to Comparative Example 2 obtained by removing the first and second dynamic dampers 21 and 22 from the damper mechanism 10 according to the embodiment.

In the damper mechanism 10 according to the embodiment, the first and second dynamic dampers 21 and 22 are coupled to the second intermediate member 14, which increases the mass of the damper mechanism 10 as a whole. This lowers the resonance frequency and shifts the resonance point to the low rotational speed side compared to the damper mechanisms according to Comparative Examples 1 and 2. Thus, in the damper mechanism 10, as illustrated in FIG. 3, resonance of the entire damper is caused in a rotational speed range that is lower than the lock-up rotational speed Nlup which is 1000 rpm, for example, and the vibration level with the rotational speed of the engine being around the lock-up rotational speed Nlup is lowered compared to the damper mechanisms according to Comparative Examples 1 and 2. In addition, the second intermediate member 14 of the damper mechanism 10 is interposed between the first springs SP1 and the intermediate springs SPm and the second springs SP2, and is more likely to vibrate than the drive member 11 and the driven member 15, among the other rotary elements of the damper mechanism 10. Thus, if the first and second dynamic dampers 21 and 22 are coupled to the second intermediate member 14, vibration of the second intermediate member 14 can be suppressed by one of the first and second dynamic dampers 21 and 22 (in the embodiment, the first dynamic damper 21) to further lower the vibration level of the entire damper mechanism 10 around the lock-up rotational speed Nlup, and resonance of one of the first and second dynamic dampers, that is, vibration (see the encircled portion of Comparative Example 2) caused as vibration is damped by one of the first and second dynamic dampers, can be suppressed by the other of the first and second dynamic dampers 21 and 22 (in the embodiment, the second dynamic damper 22). As a result, in the fluid transmission apparatus 1 including the damper mechanism 10, vibration transferred from the engine to the front cover 3 via the lock-up clutch mechanism 8 can be effectively damped when the rotational speed of the engine (front cover) is in a low range, that is, around the lock-up rotational speed Nlup which is set to be low in consideration of the efficiency.

As has been described above, the fluid transmission apparatus 1 serving as the starting device includes the first and second dynamic dampers 21 and 22 coupled via the coupling member 20 to the second intermediate member 14 of the damper mechanism 10 which damps vibration of the engine to transfer power to the speed change device. The second dynamic damper 22 includes at least the turbine runner 5 as the mass body (second mass body). Consequently, use of the turbine runner 5 as the mass body of one of the first and second dynamic dampers 21 and 22 makes it possible to reduce the number of parts of the fluid transmission apparatus 1, and to make the fluid transmission apparatus 1 compact.

In the embodiment described above, in addition, the second ends of the inner peripheral-side springs SPi which constitute the first dynamic damper 21 together with the first mass body 23 which is independent of the damper mechanism 10 are engaged with the inner peripheral-side spring abutment portions 201 formed at the inner peripheral portion of the coupling member 20, and the second ends of the outer peripheral-side springs SPo which constitute the second dynamic damper 22 together with the turbine coupling member 24 and the turbine runner 5 serving as the second mass body which is independent of the damper mechanism 10 are engaged with the outer peripheral-side spring abutment portions 202 formed at the outer peripheral portion of the coupling member 20. That is, the coupling member 20 projects radially outward with respect to the position at which the coupling member 20 is coupled to the inner peripheral-side springs SPi so as to be coupled to the outer peripheral-side springs SPo.

Consequently, with the inner peripheral-side springs SPi constituting the first dynamic damper 21 being engaged with the inner peripheral-side spring abutment portions 201 of the coupling member 20 and with the outer peripheral-side springs SPo constituting the second dynamic damper 22 being engaged with the outer peripheral-side spring abutment portions 202 of the coupling member 20, the inner peripheral-side springs SPi of the first dynamic damper 21 and the outer peripheral-side springs SPo of the second dynamic damper 22 can be brought closer to each other in the axial direction of the fluid transmission apparatus 1, and the first mass body 23 and the turbine coupling member 24 and the turbine runner 5 serving as the second mass body can be brought closer to each other. Further, common use of the coupling member 20 between the first dynamic damper 21 and the second dynamic damper 22 makes it possible to decrease the number of parts of the fluid transmission apparatus 1, and to suppress an increase in axial length of the fluid transmission apparatus 1. As a result, it is possible to shorten the axial length of the fluid transmission apparatus 1 including the first and second dynamic dampers 21 and 22 coupled via the coupling member 20 to the second intermediate member 14 of the damper mechanism 10.

In the embodiment described above, further, the coupling member 20 is disposed on the turbine runner 5 side with respect to the first plate member 231 which constitutes the first mass body 23, and extends radially outward with respect to the second plate member 232 which constitutes the first mass body 23 so as to be coupled to the outer peripheral-side springs SPo at a location radially outward of the turbine runner 5. The outer peripheral-side springs SPo at least partially overlap the turbine runner 5 in the axial direction. Consequently, the outer peripheral-side springs SPo of the second dynamic damper 22 can be disposed in a region in the vicinity of the outer peripheral portion of the turbine runner 5, which tends to be a dead space, to be engaged with the outer peripheral-side spring abutment portions 202 of the coupling member 20, and the space efficiency of the fluid transmission apparatus 1 can be further improved.

In the embodiment described above, in addition, the second mass body of the second dynamic damper 22 is composed of the turbine runner 5 of the fluid transmission apparatus 1, and the turbine coupling member 24 which is fixed to the turbine runner 5 and which has the spring abutment portions 241 which abut against (are engaged with) the outer peripheral-side springs SPo. Consequently, use of the turbine runner 5 as the second mass body of the second dynamic damper 22 makes it possible to secure a sufficient mass of the second mass body of the second dynamic damper 22 and to suppress an increase in axial length of the fluid transmission apparatus 1.

In the embodiment described above, further, the first mass body 23 is composed of the first plate member 231 and the second plate member 232 which face each other in the axial direction of the fluid transmission apparatus 1 and which are coupled to each other, and the coupling member 20 extends between the first plate member 231 and the second plate member 232 to project radially outward. Consequently, a sufficient mass of the first mass body 23 can be secured and an increase in axial length of the fluid transmission apparatus 1 can be suppressed by reducing the dimensions of the first and second plate members 231 and 232 which constitute the first mass body 23 in the axial direction of the fluid transmission apparatus 1.

In the embodiment described above, in addition, the first plate member 231 which constitutes the first mass body 23 extends radially outward to support the outer peripheral-side springs SPo in the axial direction of the fluid transmission apparatus 1. Consequently, the entire fluid transmission apparatus 1 can be made more compact by using the first plate member 231 which constitutes the first mass body 23 also as a support member for the outer peripheral-side springs SPo of the second dynamic damper 22.

In the embodiment described above, further, the coupling member 20 includes the axially extending portion 204 which extends in the axial direction of the fluid transmission apparatus 1 toward the turbine runner 5 at a location radially outward of the second plate member 232. Consequently, the outer peripheral-side spring abutment portions 202 formed at the outer peripheral portion of the coupling member 20 and the outer peripheral-side springs SPo of the second dynamic damper 22 disposed in a region in the vicinity of the outer peripheral portion of the turbine runner 5 can be engaged with each other, the inner peripheral-side springs SPi of the first dynamic damper 21 and the outer peripheral-side springs SPo of the second dynamic damper 22 can be brought closer to each other in the axial direction of the fluid transmission apparatus 1, and the first mass body 23 and the turbine runner 5 and the turbine coupling member 24 which serve as the second mass body can be brought closer to each other.

In the embodiment described above, in addition, the first plate member 231 includes the axially extending portion 231a which extends in the axial direction of the fluid transmission apparatus 1 toward the turbine runner 5 at a location radially outward of the axially extending portion 204 of the coupling member 20, and the outer peripheral portion 231o which extends radially outward from an end portion of the axially extending portion 231a on the turbine runner 5 side. Consequently, the first plate member 231 can be extended radially outward to secure a sufficient mass of the first plate member 231, and an increase in axial length of the fluid transmission apparatus 1 can be suppressed by reducing the gap between the damper mechanism 10 (first intermediate member 12) and the outer peripheral-side springs SPo and the turbine coupling member 24 of the second dynamic damper 22, that is, the space for arrangement of the outer peripheral portion 231o of the first plate member 231, as much as possible.

Further, as in the above embodiment, if the first and second dynamic dampers 21 and 22 are coupled to the second intermediate member 14 which constitutes the intermediate element of the damper mechanism 10, vibration of the second intermediate member 14 can be suppressed by one of the first and second dynamic dampers 21 and 22 to lower the vibration level of the entire damper mechanism 10 around the lock-up rotational speed Nlup, and resonance of one of the first and second dynamic dampers, that is, vibration caused as vibration is damped by one of the first and second dynamic dampers, can be suppressed by the other of the first and second dynamic dampers 21 and 22.

In the embodiment described above, in addition, the rigidity of the inner peripheral-side springs SPi which constitute the first dynamic damper 21 is determined to be higher than the rigidity of the outer peripheral-side springs SPo which constitute the second dynamic damper 22. Consequently, vibration of the second intermediate member 14 of the damper mechanism 10 can be suppressed by the first dynamic damper 21, so that the vibration level of the entire damper mechanism 10 is lowered, and resonance of the first dynamic damper 21, that is, vibration caused as vibration is damped by the first dynamic damper 21, can be suppressed by the second dynamic damper 22.

Thus, in the fluid transmission apparatus 1, vibration transferred from the engine to the front cover 3 via the lock-up clutch mechanism 8 can be effectively damped by the first and second dynamic dampers 21 and 22. It should be noted, however, that the coupling member 20 described above may be coupled to any of the drive member 11 which serves as the input element of the damper mechanism 10, the first intermediate member 12 which constitutes the intermediate element, and the driven member 15 which serves as the output element in place of the second intermediate member 14.

In the fluid transmission apparatus 1 described above, if the first springs SP1 and the intermediate springs SPm of the damper mechanism 10 are disposed so as to at least partially overlap the axially extending portion 231a of the first plate member 231 in the axial direction (so as to at least partially overlap the axially extending portion 231a as seen in the radial direction), the axial length of the fluid transmission apparatus 1 can be further shortened. In addition, if the outer peripheral portion 80a of the lock-up piston 80 (the radially outer portion of the lock-up clutch mechanism 8), the first springs SP1 and the intermediate springs SPm of the damper mechanism 10, the outer peripheral portion 231o of the first plate member 231 (the radially outer portion of the first mass body), and the outer peripheral-side springs SPo are disposed at the same height in the radial direction, the axial length of the fluid transmission apparatus 1 can be further shortened. Further, while the fluid transmission apparatus 1 discussed above is constituted as a torque converter including the pump impeller 4, the turbine runner 5, and the stator 6, the fluid transmission apparatus 1 including the damper mechanism according to the present invention may also be constituted as a fluid coupling including no stator. Further, the fluid transmission apparatus 1 discussed above may include a multi-plate friction lock-up clutch mechanism in place of the single-plate friction lock-up clutch mechanism 8.

Here, the correspondence between the main elements of the embodiment described above and the main elements of the invention described in the "SUMMARY OF THE INVENTION" section will be described. That is, in the embodiment described above, the fluid transmission apparatus 1 including the damper mechanism 10 that has the drive member 11, the first intermediate member 12, the second intermediate member 14, and the driven member 15 and serving as power transfer members that transfer power from the engine to the speed change device corresponds to the "starting device". The first dynamic damper 21 including the inner peripheral-side springs SPi and the first mass body 23 coupled to the first ends of the inner peripheral-side springs SPi corresponds to the "first dynamic damper". The second dynamic damper 22 including the outer peripheral-side springs SPo and the turbine coupling member 24 and the turbine runner 5 serving as the second mass body coupled to the first ends of the outer peripheral-side springs SPo corresponds to the "second dynamic damper". The coupling member 20 which couples the second ends of the inner peripheral-side springs SPi and the second ends of the outer peripheral-side springs SPo to the second intermediate member 14 serving as a power transfer member corresponds to the "coupling member". The correspondence between the main elements of the embodiment and the main elements of the invention described in the "SUMMARY OF THE INVENTION" section does not limit the elements of the invention described in the "SUMMARY OF THE INVENTION" section, because such correspondence is an example given for the purpose of specifically describing the invention described in the "SUMMARY OF THE INVENTION" section. That is, the embodiment is merely a specific example of the invention described in the "SUMMARY OF THE INVENTION" section, and the invention described in the "SUMMARY OF THE INVENTION" section should be construed on the basis of the description in that section.

A mode for carrying out the present invention has been described above by way of an embodiment. It is a matter of course that the present invention is not limited to the embodiment in any way, and that the present invention may be modified in various ways without departing from the scope and spirit of the present invention.

INDUSTRIAL APPLICABILITY

The present invention can be utilized in the starting device manufacturing industry.

The invention claimed is:
1. A starting device, comprising:
a pump impeller,
a turbine runner capable of rotating together with the pump impeller,
a damper mechanism that has an input element configured to receive power in the form of torque from an internal combustion engine, an output element coupled to a speed change device, and an intermediate element disposed between the input element and the output element,
a first dynamic damper including a first elastic member and a first mass body coupled to one end of the first elastic member, the first dynamic damper is coupled to the intermediate element;
a second dynamic damper including a second elastic member and a second mass body coupled to one end of the second elastic member, the second dynamic damper is coupled to the intermediate element; and
a lock-up clutch that is configured to transfer the power from the internal combustion engine to the input element when engaged, wherein
one of the first mass body of the first dynamic damper and the second mass body of the second dynamic damper includes at least the turbine runner,
the first dynamic damper and the second dynamic damper are configured to damp vibration transferred to the speed change device,
the intermediate element is engaged with the input element via a third elastic member, and is engaged with the output element via a fourth elastic member;
the damper mechanism forms a torque transfer path when the lock-up clutch is engaged that transmits the torque from the internal combustion engine to the speed change device in the following order: the lock-up clutch, the input element, the third elastic member, the intermediate member, the fourth elastic member, and the output element, and
the first dynamic damper and the second dynamic damper are not included in the torque transfer path when the lock-up clutch is engaged.

2. The starting device according to claim 1, further comprising:
a coupling member that couples the other end of the first elastic member and the other end of the second elastic member to the intermediate element, wherein
the coupling member projects radially outward with respect to a position at which the coupling member is coupled to the first elastic member to be coupled to the second elastic member.

3. The starting device according to claim 2, wherein
the coupling member is coupled to the second elastic member at a location radially outward of the turbine runner.

4. The starting device according to claim 3, wherein
the second elastic member at least partially overlaps the turbine runner in an axial direction.

5. The starting device according to claim 3, wherein
the second mass body of the second dynamic damper includes the turbine runner and a turbine coupling member that couples the turbine runner and the second elastic member to each other.

6. The starting device according to claim 2, wherein
the first mass body of the first dynamic damper is composed of a first plate member and a second plate member that face each other in an axial direction of the starting device and that are coupled to each other, and the coupling member extends between the first plate member and the second plate member to project radially outward.

7. The starting device according to claim 6, wherein
the first plate member extends radially outward to support the second elastic member in the axial direction of the starting device.

8. The starting device according to claim 7, wherein
the coupling member includes an axially extending portion that extends in the axial direction toward the turbine runner at a location radially outward of the second plate member.

9. The starting device according to claim 8, wherein
the first plate member includes an axially extending portion that extends in the axial direction toward the turbine runner at a location radially outward of the axially extending portion of the coupling member, and an outer peripheral portion that extends radially outward from the axially extending portion.

10. The starting device according to claim 9, wherein:
the third elastic member at least partially overlaps the axially extending portion of the first plate member in the axial direction.

11. The starting device according to claim 10, further comprising:
a lock-up clutch that selectively couples the internal combustion engine and the damper mechanism to each other, wherein
a radially outer portion of the lock-up clutch, the third elastic member of the damper mechanism, a radially outer portion of the first mass body, and the second elastic member are disposed at the same height in a radial direction.

12. The starting device according to claim 1, wherein a rigidity of the first elastic member is higher than a rigidity of the second elastic member.

13. The starting device according to claim 4, wherein the second mass body of the second dynamic damper includes the turbine runner and a turbine coupling member that couples the turbine runner and the second elastic member to each other.

14. The starting device according to claim 1, wherein the intermediate element comprises a first intermediate member, an intermediate elastic member, and a second intermediate member.

15. The starting device according to claim 14, wherein the first intermediate member and the second dynamic damper are coupled to the second intermediate member.

16. The starting device according to claim 1, wherein the other end of the first elastic member is coupled to the intermediate member, and the other end of the second elastic member is coupled to the intermediate member.

17. The starting device according to claim 1, wherein the first dynamic damper is configured such that a rigidity of the first elastic member and a weight of the first mass body are adjustable, and the second dynamic damper is configured such that a rigidity of the second elastic member and a weight of the second mass body are adjustable.

18. The starting device according to claim 1, wherein the lock-up clutch is not engaged, one of the first dynamic damper and the second dynamic damper is included in the torque transfer path between the turbine runner and the intermediate element, the other of the first dynamic damper and the second dynamic damper is not included in the torque transfer path between the turbine runner and the intermediate element.

* * * * *